Dec. 29, 1925.

E. J. ALLEN ET AL 1,567,780

MOWER SICKLE BAR ATTACHMENT

Filed Jan. 22, 1923

INVENTORS
E. J. Allen and G. A. Allen
BY
ATTORNEY

Patented Dec. 29, 1925.

1,567,780

UNITED STATES PATENT OFFICE.

EDWARD J. ALLEN AND GEORGE A. ALLEN, OF MERCED, CALIFORNIA.

MOWER-SICKLE-BAR ATTACHMENT.

Application filed January 22, 1923. Serial No. 614,103.

*To all whom it may concern:*

Be it known that we, EDWARD J. ALLEN and GEORGE A. ALLEN, citizens of the United States of America, residing at Merced, county of Merced, State of California, have invented certain new and useful Improvements in Mower-Sickle-Bar Attachments; and we do declare the following to be a full, clear, and exact description of the same, reference being had to the accompanying drawings, and to the characters of reference marked thereon, which form a part of this application.

This invention relates to improvements in mowing devices, the principal object being to provide a means, in the form of an attachment applicable to ordinary or standard mowers, for dividing the grass, alfalfa, or other growth being mowed, before reaching the knives or cutting members of the mower, and making a positive line of cleavage between the growth to be cut at any one run of the mower, and that left standing.

This prevents bunching of the grass, etc., at the outer end of the cutter, which causes a pulling rather than a cutting action to be had, and tends to clogging of the knives at that end.

A further object is to provide a device for the purpose which may be applied to a mower without necessitating changes of any character being made to the latter.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claim.

In the drawings similar characters of reference indicate corresponding parts in the several views.

Figure 1:
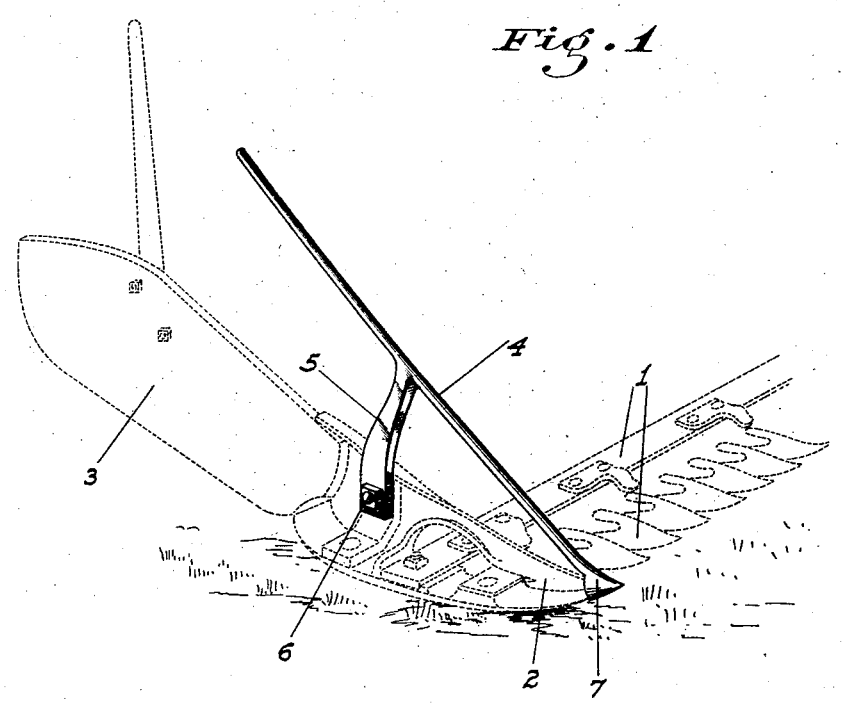
Fig. 1 is a perspective view of our device as applied to a mower, looking toward the rear.
Figure 2:
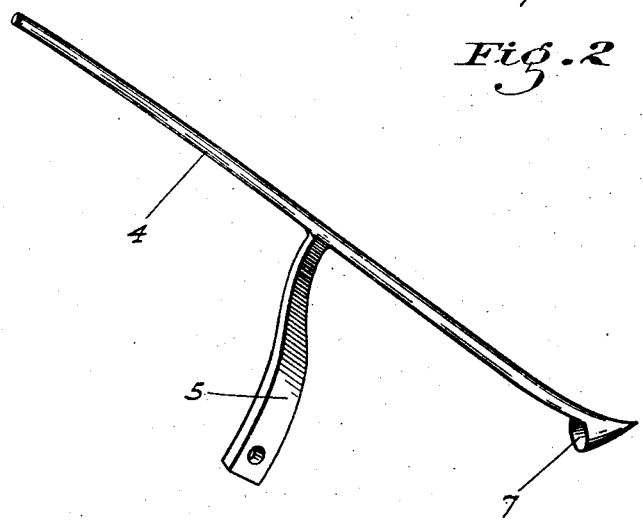
Fig. 2 is a perspective view of the device detached, looking toward the front.

Referring now more particularly to the characters of reference on the drawings, the numeral 1 denotes the sickle bar and cutting mechanism of a mower of ordinary character provided with the usual pointed shoe 2 at the outer end, and the so-called dividing-board 3 fastened to the shoe and extending rearwardly thereof.

This dividing board however, as will be evident, does not divide the bunches of standing grass, etc., before they are cut, since it is to the rear of the line of cut, and its function therefore is more to prevent the grass after being cut from falling over onto that still standing.

The objects of our invention are carried out by providing a rigid bar or rod 4 perfectly straight from end to end which extends rearwardly from the forward end of the shoe 2 a certain distance and with an upward slope, so as to make an angle of approximately 30° with the shoe and ground.

This rod or bar is held so as to be maintained at this angle and to also slope inwardly of the vertical plane of the shoe and board 3 by means of a strap 5 rigidly fixed to and depending from under said bar intermediate the ends thereof, and extending thence down to and outside of the shoe, being removably yet rigidly connected to the latter by means of one of the bolts 6 with which the shoe is already provided, this bolt being to the rear of the connection of the sickle bar with the shoe.

The forward end of the bar 4 joins with a smooth curve onto a rearwardly opening cone-shaped cup or socket member 7, so shaped as to fit over the pointed forward end of the shoe 2, the latter being customarily so shaped, and the axial line of the cup being set at such an angle to the bar, and directly therebelow, so that when the cup is seated on the shoe-point the bar will project upwardly at the desired angle as above stated. The cup terminating as it does in a point, also serves as an entering wedge to divide the bunches of grass. Said cup also has a snug fit on the shoe-point, and projects but slightly beyond said point.

In addition to this, the under side of the cup has a decided upward slant as shown, so that the cup has no tendency to dig into checks or the like as would otherwise be the case.

It will be evident that it is but the work of a minute to attach the device, and that it will then efficiently function as intended, that is, to cleave or divide any bunches of growth in its path, so that any such growth on the outside of the shoe will be positively left standing, while that on the inside will just as certainly be cut by the knives, without any possibility of pulling instead of cutting, and without any tendency to clog the knives.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention, what we claim as new and useful and desire to secure by Letters Patent is:

A one-piece auxiliary divider attachment for mowers of that type having a pointed dividing shoe comprising a rounded and smooth surfaced socket adapted to snugly fit over the shoe point, a rod projecting rearwardly and upwardly therefrom and making a smooth junction with the socket, and a bar projecting downwardly from the under side of the rod and making a smooth junction therewith, the lower end of said bar being adapted to contact against the outer face of the shoe and to be rigidly secured thereto.

In testimony whereof we affix our signatures.

EDWARD J. ALLEN.
GEORGE A. ALLEN.